United States Patent [19]
Orensteen et al.

[11] Patent Number: 5,706,133
[45] Date of Patent: Jan. 6, 1998

[54] RETROREFLECTIVE SIGNAGE ARTICLES, KITS FOR PRODUCING SAME, AND METHODS OF MAKING SIGNAGE ARTICLES

[75] Inventors: Bruce D. Orensteen, St. Paul; Lisa Flatt Nelson, Inver Grove Heights; Thomas F. Look, Ham Lake; Joseph R. Zwack, Roseville, all of Minn.

[73] Assignee: Minnesota Mining and Manufacturing Company, St. Paul, Minn.

[21] Appl. No.: 386,280

[22] Filed: Feb. 9, 1995

[51] Int. Cl.$^6$ .............................. G02B 5/128; B32B 3/00
[52] U.S. Cl. ................ 359/530; 359/539; 359/542; 359/900; 428/207; 428/480; 428/914
[58] Field of Search .................. 359/529–543, 359/900; 427/258, 261, 163.4, 209; 428/204, 207, 423.7, 424.6, 480, 500, 914

[56] References Cited

U.S. PATENT DOCUMENTS

| | | |
|---|---|---|
| 2,407,680 | 9/1946 | Palmquist et al. . |
| 3,140,340 | 7/1964 | Weber . |
| 3,190,178 | 6/1965 | McKenzie . |
| 3,648,348 | 3/1972 | Freimuth . |
| 4,025,159 | 5/1977 | McGrath . |
| 4,268,117 | 5/1981 | Sevelin . |
| 4,511,210 | 4/1985 | Tung et al. . |
| 4,576,850 | 3/1986 | Martens . |
| 4,588,258 | 5/1986 | Hoopman . |
| 4,664,966 | 5/1987 | Bailey et al. . |
| 4,801,193 | 1/1989 | Martin . |
| 4,895,428 | 1/1990 | Nelson et al. . |
| 4,896,943 | 1/1990 | Toliver et al. . |
| 4,938,563 | 7/1990 | Nelson et al. . |
| 5,064,272 | 11/1991 | Bailey et al. . |
| 5,066,098 | 11/1991 | Kult et al. . |
| 5,139,598 | 8/1992 | Chou et al. . |
| 5,236,739 | 8/1993 | Chou et al. . |
| 5,248,561 | 9/1993 | Fujiwara et al. ............ 428/488.1 |
| 5,356,853 | 10/1994 | Ueno et al. . |
| 5,369,078 | 11/1994 | Eguchi et al. . |
| 5,374,601 | 12/1994 | Takiguchi et al. . |
| 5,376,432 | 12/1994 | Umise et al. . |
| 5,393,590 | 2/1995 | Caspari . |
| 5,451,447 | 9/1995 | Li ............................. 428/143 |

FOREIGN PATENT DOCUMENTS

| | | |
|---|---|---|
| WO 94/19710 | 9/1994 | WIPO . |
| WO 94/19769 | 9/1994 | WIPO . |
| WO 95/02515 | 1/1995 | WIPO . |

OTHER PUBLICATIONS

The Chemistry of Organic Film Formers, by D.H. Solomon, 2nd Edition, (1977), Chapters 1, 2, 3, 4, 5 and 9.

*Primary Examiner*—James Phan
*Attorney, Agent, or Firm*—Karl G. Hanson; Jeffrey L. Wendt; Ann M. Mueting

[57] ABSTRACT

Retroreflective signage articles comprise a colorant layer directly thermally transferred to a top layer of a reretroreflective sheeting, the top layer devoid of priming treatments and extraneous print-receptive layers. Systems or kits are also described comprising a retroreflective base sheeting in combination with a thermal mass transfer donor element, the donor elements comprising a carrier and a colorant layer adhered thereto, the colorant layer of the signage articles and the donor elements comprising a binder and a colorant. Methods of producing the signage articles employing the systems or kits are also presented.

14 Claims, 1 Drawing Sheet

RETROREFLECTIVE SIGNAGE ARTICLES, KITS FOR PRODUCING SAME, AND METHODS OF MAKING SIGNAGE ARTICLES

BACKGROUND OF THE INVENTION

1. Field of the Invention

The present invention relates to thermal mass transfer printed signage articles. In particular, the present invention relates to the use of kits to produce retroreflective signage articles, the kits comprising a retroreflective base sheeting and a thermal mass transfer donor element.

2. Related Art

Thermal mass transfer processes use a donor sheet (commonly denoted a "ribbon" or "foil") and a receptor sheet or substrate. The thermal mass transfer donor sheet normally comprises a carrier layer and a colorant layer with at least a thermally transferable colorant (a dye or preferably a pigment) in a heat softenable binder. The colorant layer typically consists of a pigment dispersed in a binder (the binder transferring with the pigment during thermal transfer). Thermal mass transfer sheets are used with the donor surface (colorant layer) in intimate contact with a receptor material, and the donor sheet is heated in an imagewise manner (e.g., by thermal pitheads, irradiation as by a laser or high intensity radiation transmitted through a mask or stencil) to transfer the image forming material. In the thermal mass transfer system, the colorant layer is softened by the imagewise heating (and sometimes a receptor layer on the receptor sheet is contemporaneously softened), and the softened area is transferred to the receptor sheet. The ultimate use of the substrate having the transferred image thereon frequently dictates the durability requirements of the image.

Thermal mass transfer is useful for preparing outdoor durable signage articles, such as automobile registration tags which are adhered to license plates. See, for example, Patent Cooperation Treaty applications WO 94/19710 (claiming priority from U.S. Ser. Nos. 08/017,573 and 08/033,627) and WO 94/19769 (claiming priority from U.S. Ser. Nos. 08/017,573 and 08/033,625), both published Sep. 1, 1994. In particular, the published '710 application describes polymeric sheeting materials directly thermally printed upon with a thermal printing system and a resin-based colorant/binder, the polymeric sheeting material comprising a a core sheet and a thermally print receptive surface on the core sheet, the thermally print receptive surface formed from compositions comprising a polyurethane dispersion. The '710 application refers to the print receptive surface as being the surface of a multi-function layer, so called because the layer is print receptive and durable. The polyurethane multi-function surface also affords the advantage of the user having to understand only one surface chemistry for subsequent thermal transfer printing.

There is a need in the signage art, particularly those meant for outdoor usage, to be able to apply colorful, transparent, and durable (i.e. not easily removed and not changing significantly in color and brightness) images to many different retroreflective base sheeting substrates, without the use of priming and/or extraneous print-receptive layers.

SUMMARY OF THE INVENTION

The present invention overcomes many deficiencies of the prior art in providing good quality, durable, colorful, and preferably transparent thermal mass transfer images on a variety of retroreflective base sheetings.

A first aspect of the invention is a signage article comprising:
a) a retroreflective base sheeting comprising a cover material positioned between retroreflective elements and a source of light, the cover material having an exposed surface devoid of primer treatments (mechanical and chemical) and extraneous print-receptive layers (i.e. layers not particularly necessary for completing the optics of the base sheeting), the top layer comprising materials selected from the group consisting of polyester, polyester melamine resin, vegetable oil extended polyester melamine resin, plasticized polyvinylchloride, acrylic resins, polyvinylbutyral resin, crosslinked polyurethane/acrylics, and extruded substantially thermoplastic polymers having an elongation of at least 50% and a tensile relaxation force from 50% elongation after 5 minutes relaxation of no more than 2300 N/m width; and
b) thermal mass transfer printed matter adhered to the exposed surface of the cover film, the thermal mass transfer printed matter consisting essentially of a polymeric binder and a colorant, the polymeric binder selected from the group consisting of polyalkylene polymers, mixtures of polyalkylene polymers and an acrylic polymer, and copolymers of an alkylene monomer and an acrylic monomer. Particularly preferred articles are those wherein the retroreflective base sheeting is selected from embedded lens sheeting, encapsulated lens sheeting, cube-corner sheeting, and combinations thereof.

A first embodiment within this aspect of the invention is an embedded lens retroreflective signage article (referred to herein as embedded lens 1) comprising:
a) a retroreflective base material comprising:
i) a binder layer;
ii) a monolayer of lenses anchored in the binder layer; and
iii) a specularly reflective layer underlying and spaced from the lenses by a tranparent material;
b) a weather-resistant, transparent cover film attached to the binder layer of the retroreflective base material, the cover film comprising extruded, substantially thermoplastic polymer having an elongation of at least 50% and a tensile relaxation force from 50% elongation after 5 minutes relaxation of no more than 2300 N/m width (preferably no more than 1000 N/m,); and
c) the thermal mass transfer printed matter described herein adhered to the cover film.

In the first embodiment, the substantially thermoplastic polymer comprises a copolymer of monomers comprising by weight a major proportion of at least one of ethylene and propylene and a minor proportion of a second monomer, wherein the second monomer is preferably a first acid-functional monomer selected from the group consisting of acrylic acid and methacrylic acid, and preferably wherein the first acid-functional monomer is crosslinked by cations selected from the group consisting of zinc, sodium, and potassium. A modified version of this embodiment has a crosslinked aliphatic polyurethane layer coated onto the transparent cover film.

A second embodiment within the first aspect of the invention is an embedded lens retroreflective signage article (referred to herein as embedded lens 2) comprising:
a) a retroreflective base material comprising:
i) a polyester melamine binder layer defining a first major surface and a second major surface ii) a space coat layer comprising polyvinylbutyral contacting the second major surface of the binder layer;

iii) a monolayer of microspheric lenses having bottommost and topmost surfaces, the bottommost surfaces embedded in the spacecoat layer and the topmost surfaces embedded in the binder layer; and iv) a specularly reflective layer positioned between the monolayer of microspheric lenses and a pressure-sensitive adhesive layer;

b) a weather-resistant, transparent cover film attached to the first major surface of the binder layer of the retroreflective base material, the cover film comprising polymers selected from the group consisting of polyester melamine, oil extended polyester melamine, and plasticized polyvinylchloride resins; and c) the thermal mass transfer printed matter described herein adhered to the cover film.

A third embodiment within the first aspect of the invention is an encapsulated lens retroreflective signage article comprising:

a) a retroreflective base material comprising:
i) a base sheet having a layer of retroreflective elements disposed over one of its surfaces;
ii) a cover sheet disposed in spaced relation from the layer of retroreflective elements, the cover sheet comprising a first acrylic material;

b) a network of narrow intersecting bonds extending between the cover sheet and base sheet and comprising binder material thermoformed at the point of contact between the bonds and at least one of the cover sheet and base sheet so as to adhere the two sheets together and form a plurality of cells within which retroreflective elements are hermetically sealed, the binder material selected from the group consisting of materials having increased adhesion to at least one of the cover and base sheet when a solid layer of the material that has been previously laminated to the sheet is cured, the binder material having been cured in situ after being thermoformed, the bonds having increased bond strength to the cover sheet and base sheet; and c) thermal mass transfer printed matter adhered to the cover sheet as herein described.

Preferred articles in accordance with the third embodiment of the invention are those wherein the binder material of the base sheeting comprises a second acrylic material, and wherein the first acrylic material of the cover sheet and the second acrylic material both comprise polymethylmethacrylate (PMMA). Also preferred are those articles wherein the cover sheet includes ingredients that coreact with the binder material during curing of the binder material, and those articles wherein the retroreflective elements comprise transparent microspheres or cube-corner elements. Preferably both the base sheet and the cover sheet comprise radiation curable material. A particularly preferred article in accordance with the third embodiment of the invention is wherein the surface of the cover film engaged by the bonds is configured to provide cube-corner retroreflective elements, and the layer of retroreflective elements disposed over a surface of the base sheet comprises transparent microspheres.

Particularly preferred signage articles include outdoor durable signage such as highway signs, automobile registration validation stickers and window stickers, and license plates. The colorant layer of signage articles of the invention may be exposed, buried beneath one or more polymeric cover layers, or both.

A second aspect of the invention is a kit for producing retroreflective signage articles, the kit comprising:

a) a retroreflective base sheeting having a top layer as described herein with respect to the inventive signage articles; and b) a thermal mass transfer donor element as herein described.

Particularly preferred are kits are those wherein the retroreflective base sheeting is selected from embedded lens sheeting, encapsulated lens sheeting, cube-corner sheeting, and combinations thereof. If the retroreflective base sheeting is an embedded lens sheeting, the embedded lens sheeting is preferably selected from the group consisting of embedded lens reflective sheetings 1 and 2 as described above.

A third aspect of the invention is a method of making a retroreflective signage article, the method comprising the steps of:

a) selecting a retroreflective base sheeting having a top layer, the top layer devoid of priming material or other print receptive layers;

b) selecting a thermal mass transfer donor article, the donor article comprising a carrier and a thermal mass transfer composition adhered to the carrier, the thermal mass transfer composition consisting essentially of a polymeric binder and a colorant, the polymeric binder selected from the group consisting of polyalkylene polymers, mixtures of polyalkylene polymers and an acrylic polymer, and copolymers of an alkylene monomer with an acrylic monomer; and c) contacting at least a portion of the thermal mass transfer composition to the top layer of the retroreflective base sheeting using sufficient heating and pressure to transfer at least a portion of the thermal mass transfer composition to the top layer of the retroreflective base sheeting.

Preferred are those signage articles and methods of the invention wherein the top layer (i.e the print-receiving layer) of the retroreflective sheeting comprises materials selected from the group consisting of polyester, polyester melamine (either crosslinked or non-crosslinked), vegetable oil extended polyester melamine, plasticized polyvinyl chloride, acrylic resins (such as polymethylmethacrylate), polyvinylbutyral, crosslinked polyurethane/acrylics, and extruded substantially thermoplastic polymers having an elongation of at least 50% and a tensile relaxation force from 50% elongation after 5 minutes relaxation of no more than 2300 N/m width, such as ethylene copolymers of acrylic acid, methacrylic acid, and vinyl acetate and propylene copolymers of the same comonmers, and ionomers.

Exemplary signage articles within the invention are those wherein the thermal mass transfer printed matter adhered to the cover film is non-black (i.e. is colored), although black printed indicia is considered within the invention. The thermal mass transfer printed matter adhered to the cover film is also preferably transparent, wherein transparency of the printed indicia is governed by the formula $$\text{Transparency} \propto \log_{10}(I_O/I_S)$$

wherein $I_O$ is the original light intensity and $I_S$ is the scattered light intensity, and wherein the higher the value of the logarithm, the better the transparency. The term "transparent", in referring both to plastic sheeting and to retroreflective elements described herein, such as glass microspheres and cube corner retroreflective elements, means transmitting at least 90% of incident light in the visible spectrum (about 400–700 nanometers wave length), as determined by a standard spectrophotometer.

The invention will be more fully understood with reference to the following detailed description of the invention.

The figures are not to scale and are merely illustrative of the invention.

DESCRIPTION OF PREFERRED EMBODIMENTS

I. Signage Articles

Figure 1:
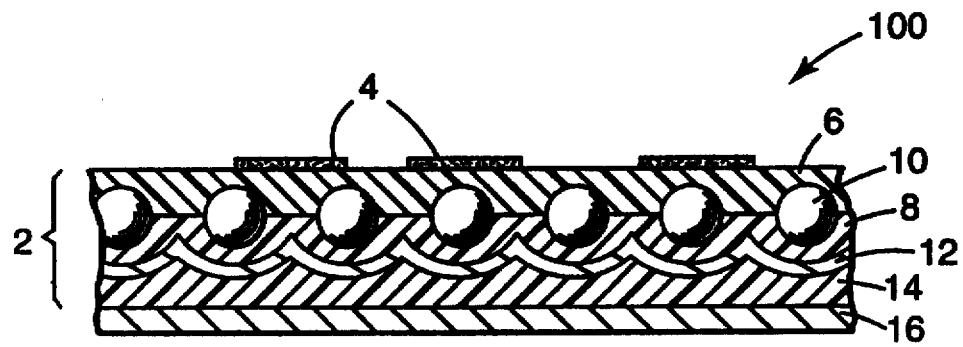
FIG. 1 is a cross-sectional view (enlarged) of an illustrative signage article within the invention.

FIG. 1 illustrates in enlarged cross section an illustrative retroreflective signage article embodiment 100 in accordance with the invention, comprising thermal mass transfer composition 4 in the form of desired alpha-numeric indicia, bar codes, logos and the like, printed directly onto a retroreflective base sheeting 2, in this embodiment comprising an oil extended polyester melamine binder layer 6 as the top layer of the sheeting. There is no priming layer or extraneous print-receptive layer between printed indicia 4 and top (binder) layer 6. A spacing layer 8, which may be the same or different chemically from binder layer 6, positions a plurality of glass microspheres 10 above a specularly reflective layer 12. Spacing layer may be polyvinylbutyral and the like. A pressure-sensitive adhesive layer 14 and optional removable liner 16 complete the structure.

Other retroreflective signage articles within the invention are similar to that illustrated in FIG. 1 except that the retroreflective base sheeting may be an encapsulated lens sheeting, cube-corner sheeting, and other forms of embedded lens sheeting than that illustrated in FIG. 1.

"Oil extended polyester melamine" refers to the use of saturated and unsaturated vegetable oils in polyester melamine resins. Although the chemistry of these systems can be complex, briefly stated, as more oil is used the less durable the material is, but the material is faster drying, thus a balance of these properties is called for. If the polyester melamine is primarily a physical mixture (i.e., not crosslinked) of a polyester (such as alkyds of phthalic anhydride and a glycol) and a melamine (such as butylated melamine), unsaturated oils are added, from 0 to about 60 weight percent of the the total binder weight, to provide a mechanism for oxidative crosslinking of the unsaturation points of the oil molecules. Examples of suitable vegetable oils include coconut oil, soy oil, colza oil, canola oil, and castor oil. A detailed discussion of this chemistry is presented in "The Chemistry of Chemical Film Formers", edited by D. H. Solomon, 2nd Ed. (1977), especially chapters 1–5 and 9, incorporated by reference herein.

Particularly preferred retroreflective base sheetings include those known under the trade designation SCOTCHLITE, particularly the 580, 3200, 3700, 3800, 3900, 4700 and 5300 series (all embedded lens type retroreflective sheetings, except the 3800 series, which is an encapsulated lens retroreflective sheeting, and the 3900 series, which is a cube-corner retroreflective sheeting), available from Minnesota Mining and Manufacturing Co., St. Paul, Minn., (hereinafter "3M"). Embedded-lens retroreflective sheetings are disclosed in U.S. Pat. Nos. 2,407,680, 4,664,966 and 4,511,210, all incorporated herein by reference. Encapsulated-lens retroreflective sheetings disclosed in U.S. Pat. Nos. 3,190,178; 4,025,159; 4,896,943; 5,064, 272; and 5,066,098, all incorporated herein by reference. Cube-corner retroreflective sheeting may also be employed, such as those disclosed in U.S. Pat. Nos. 3,140,340; 3,648, 348; 4,801,193; 4,895,428; 4,576,850; 4,588,258 and 4,938, 563, all incorporated herein by reference.

Figure 2:
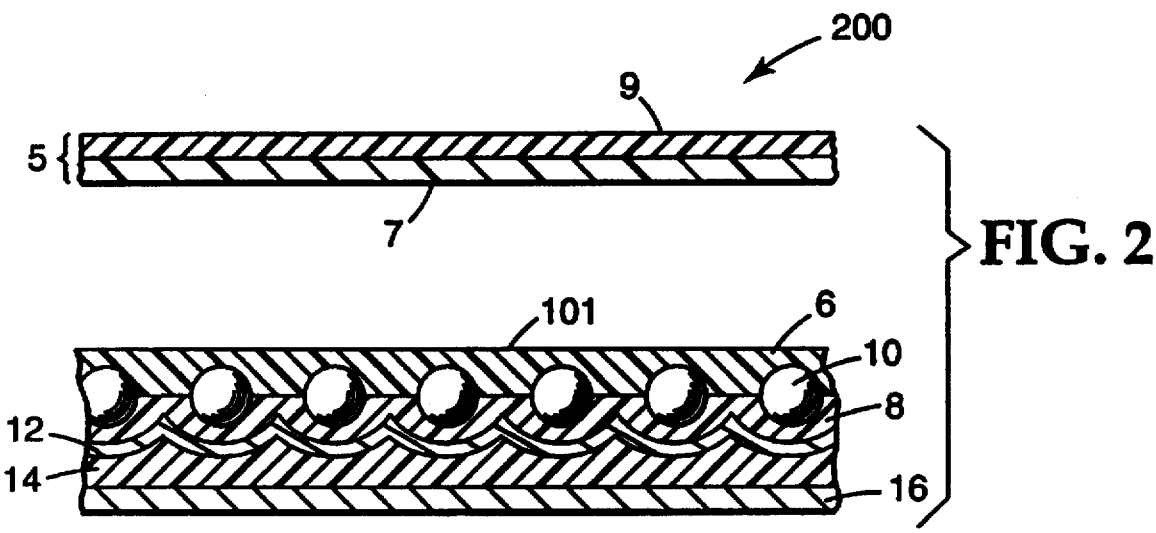
FIG. 2 is a cross-sectional view (enlarged) of an illustrative kit within the invention comprising a thermal mass transfer donor element and a retroeflective base sheeting.

II. Kits Comprising Thermal Mass Transfer Donor Elements and Retroreflective Base Sheetings FIG. 2 illustrates a kit 200 of the invention comprising a thermal mass transfer donor element 5, having colorant layer 7 coated onto a carrier 9, in this embodiment a thin polyethylene terephthalate (PET) film. An optional anti-stick/release coating (not illustrated) is typically coated onto the back side (not colorant coated side) of the carrier to allow ease of movement of the donor element past a thermal print head (see for example FIG. 3). Also illustrated is a retroreflective base sheeting 101, in this embodiment the same as article 100 of FIG. 1 but devoid of print indicia. As previously stated sheeting 101 could be an embedded lens, encapsulated lens, or cube-corner type retroreflective sheeting.

Thermal mass transfer donor elements useful in the present invention comprise a thermally mass transferable colorant layer comprising a dried version of a coatable composition coated onto a carrier.

Suitable carrier materials for the thermal mass transfer donor element may be any flexible material to which a transparent dried colorant composition or opaque white/metallic pigment layer may be adhered. Suitable carriers may be smooth or rough, transparent or opaque, and continuous (or sheet-like). They are preferably essentially nonporous. Non-limiting examples of materials that are suitable for use as a carrier include polyesters, especially PET, polyethylene naphthalate, polysulfones, polystyrenes, polycarbonates, polyimides, polyamides, cellulose esters, such as cellulose acetate and cellulose butyrate, polyvinyl chlorides and derivatives, and the like. The substrate generally has a thickness of 1 to 500 micrometers, preferably 2 to 100 micrometers, more preferably 3 to 10 micrometers. Particularly preferred carriers are white-filled or transparent PET or opaque paper.

The colorant layer thickness in thermal mass transfer donor elements useful in the invention is preferably from about 1 to about 10 micrometers, more preferably from about 2 to about 8 micrometers, and most preferably from about 3 to about 6 micrometers. The colorant layer on the thermal mass transfer donor elements useful in the invention have a melting point (mp) or softening point (sp) ranging from about 50° to about 140° C. to enhance the thermal mass transfer efficiency. Melting points below about 50° C. indicate a composition which may become tacky and blocking when not intended, while melting points above 140° C. would possibly degrade the carrier during coating and oven drying and would certainly increase the thermal energy requirement to transfer the composition to the intended substrate.

In donor elements useful in the invention which employ a polymeric film carrier (preferably polyethylene terephthalate (PET)), the polymeric film preferably has a thickness ranging from about 1 to about 10 micrometers, more preferably from about 3 to about 8 micrometers.

As stated in a preferred embodiment an anti-stick/release coating is applied to the back side of the donor element (i.e., the side opposite the thermally transferable colorant layer) to improve handling characteristics of the donor element, reduce friction, and prevent the donor element from sticking to the print substrate. Suitable anti-stick/release materials include, but are not limited to, silicone materials including poly(lower alkyl)siloxanes such as polydimethylsiloxane and silicone-urea copolymers, and perfluorinated compounds such as perfluoropolyethers.

Thermal mass transfer donor elements useful in the invention are suitable for image production, especially when the graphic image is intended to be weatherable and durable. As used herein the terms durable and durability refer to characteristics such as solvent and chemical resistance, abrasion resistance, bond maintenance of the thermal mass transfer composition to the substrate, and maintenance of color brightness and (for retroreflective substrates) retroreflective brightness. The terms weatherable and weatherability refer to the characteristics such as maintenance of retroreflective brightness, resistance to dirt, resistance to yellowing and the like, all of these in normal use conditions in the outdoors, where sunlight, temperature, and other environmental parameters may affect performance.

Thermoplastic acrylic binders useful in the invention primarily function to provide the necessary adhesion of the thermal mass transfer composition to the retroreflective substrate. The acrylic binders retain their optical properties over prolonged time periods of exposure to outdoor conditions, especially when protected from abrasion via a plastic or glass cover layer.

Thermal mass transfer donor elements useful in the invention have proven to have the best overall properties: ease of colorant layer transfer from the donor element carrier film without wrinkling of the donor element; the thus transferred colorant layer indicia has good print quality (i.e., the printed indicia is not mottled, does not have voids, has good edge definition without blocking of characters and without rough or rounded edges; and the indicia appears dense); the colorant layer adheres well to many cover film and sheet chemistries commonly used for retroreflective sheeting such as discussed herein, and the printed indicia has good abrasion resistance.

Thermal mass transfer donor elements useful in the invention of the type comprising a colorant layer adhered to a polymeric film, the colorant layer comprising a colorant and polyethylene and acrylic binders, include those available from Coding Products Co., of Traverse City, Mich., particularly donor elements known under the trade designations TTR59SP (black), TTR5940 (black), TTR5640 (blue), TTR5340 (yellow), TTR5440 (red), and TTR5740 (green). It is theorized that the binders may be either physical mixtures of a polymerized ethylene monomer and a polymer of an acrylic monomer, such as polyacrylic acid, or a copolymer of ethylene monomer with an acrylic monomer, such as ethylene/acrylic acid coplymer. It will be understood by those skilled in the art that the term acrylic acid monomer includes (meth)acrylic acid monomers. Although not intending to be bound by any particular theory, it is believed that in commercially available thermal mass transfer donor elements found useful in the invention of the type comprising binders of this nature that the ratio of polyethylene to acrylic binder is greater than 1:1 and must be carefully optimized to provide proper cohesiveness of the thermal mass transfer composition for high resolution imaging. Since both acrylic and polyethylene binders are thermoplastic, they both contribute to the necessary adhesion to the retroreflective base sheeting during thermal mass transfer printing.

Thermal mass transfer donor elements of the polyethylene binder type found useful in the invention include those available from Advent Corp. under the trade designation AD501, which is available in black, blue, green, and red.

In all thermal mass transfer donor elements found useful in the invention the polyethylene binder functions like a wax-like material in that it assists in allowing the transferred image to conform to a rough surface, such as around and between glass beads in encapsulated lens retroreflective sheeting. The polyethylene material and optional particulates also provide the benefit of reducing printer head energy input during the thermal mass transfer process.

B. Colorants

Colorants useful in the thermal mass transfer donor elements of the kits of the invention may be organic or inorganic. Suitable inorganic pigment colorants include carbon black and titania ($TiO_2$), while suitable organic pigment colorants include phthalocyanines, anthraquinones, perylenes, carbazoles, monoazo- and disazobenzimidazolone, isoindolinones, monoazonaphthol, diarylidepyrazolone, rhodamine, indigoid, quinacridone, disazopyranthrone, dinitraniline, pyrazolone, dianisidine, pyranthrone, tetrachloroisoindolinone, dioxazine, monoazoacrylide, anthrapyrimidine. Natural and synthetic dye colorants may also be used, including those based on methine, pyrazolone, quinophthalone, naphthazine, perinone, anthraquinone, and monoazo compounds.

Commercial examples of useful organic pigments include those known under the trade designations PB 1, PB 15, PB 15:1, PB 15:2, PB 15:3, PB 15:4, PB 15:6, PB 16, PB 24, and PB 60 (blue pigments); PB 5, PB 23, and PB 25 (brown pigments); PY 3, PY 14, PY 16, PY 17, PY 24, PY 65, PY 73, PY 74, PY 83, PY 95, PY 97, PY 108, PY 109, PY 110, PY 113, PY 128, PY 129, PY 138, PY 139, PY 150, PY 154, PY 156, and PY 175 (yellow pigments); PG 1, PG 7, PG 10, and PG 36 (green pigments); PO 5, PO 15, PO 16, PO 31, PO 34, PO 36, PO 43, PO 48, PO 51, PO 60, and PO 61 (orange pigments); PR 4, PR 5, PR 7, PR 9, PR 22, PR 23, PR 48, PR 48:2, PR 49, PR 112, PR 122, PR 123, PR 149, PR 166, PR 168, PR 170, PR 177, PR 179, PR 190, PR 202, PR 206, PR 207, and PR 224 (red); PV 19, PV 23, PV 37, PV 32, and PV 42 (violet pigments); and PBLACK (black). Commercially available dyes include Solvent Orange 104, 93, 160, 114, 112, 105, 54, and 163; Solvent Red 111, 135, 179, 117, 155, 52, 195, and 138; Solvent Violet 32, 31, 33, 13, and 36; Solvent Blue 94, 95, 35, 198, 97; and Solvent Green 3, 28. Most of the above dyes and pigments are commercially available from the major chemical manufacturers, including Cookson Pigments Co., Ciby-Geigy, BASF, SANDOZ, Hoescht, and Miles, Inc.

It will be recognized by those skilled in the art that various organic compounds useful as pigments and/or dyes will be differently shaded, or even different color, depending on the functional groups attached to the main molecule. However, most of the listed organic pigments have proven to be durable in simulated weatherometer testing in that they retain much of their initial brightness, as exemplified herein below.

III. Methods of Making Signage Articles

The retroreflective signage articles of the present invention are produced by using a kit of the invention comprising a thermal mass transfer donor element and a retroreflective base sheeting, both as described herein. In one method, illustrated schematically in FIG. 3, a thermal mass transfer donor element 24 and a retroreflective base sheeting 26, typically both in roll form, are installed on separate feed fittings 20 and 22, respectively, of a thermal mass transfer printing apparatus. One such apparatus as that known under the trade designation ZEBRA 140, available from ZEBRA Technologies Corp., of Chicago, Ill. Donor element 24 and retroreflective base sheeting 26 move simultaneously past a print station 28 comprising a print head 30 to produce printed indicia 32. The donor element and printed retroreflective sheeting may then be taken up on separate rolls, 36 and 34, respectively. Alternatively, the printed sheeting may pass through a cutting station, such as when vehicle identification tags and the like are to be produced. The person skilled in the retroreflective signage art will recognize other variations of the method, such as those disclosed in assignee's published Patent Cooperation Treaty application WO 94/19769, published Sep. 1, 1994, incorporated herein by reference, such as image definition provided by a computer, which signals the print head to print the desired indicia.

Figure 3:
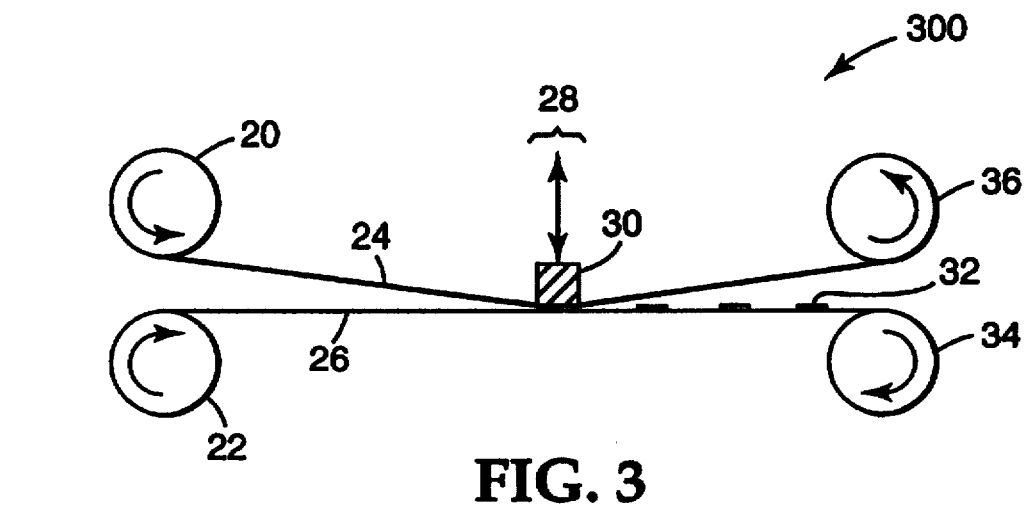
FIG. 3 is a schematic view of a method of making a retroreflective signage article of the invention employing a kit of the invention comprising a retroreflective base sheeting and a thermal mass transfer donor element.

As depicted in FIG. 3, the transferable colorant layer of the donor element or ribbon is positioned such that the thermally transferable colorant layer is in contact with the top surface (i.e. the light impinging surface) of the retroreflective base sheeting. Heat is applied, either from a thermal stylus or an infrared heat source such as an infrared laser or a heat lamp, and in some instances pressure, and the colorant layer is transferred to the retroreflective base sheeting in the desired form, for example a bar code, alpha-numerics, and the like. The heat and pressure may be applied to the back of either the donor ribbon or retroreflective sheet, or heat may be directly introduced to the transferable colorant layer. In thermal mass transfer printers such as that known under the trade designation ZEBRA 140, it is desirable that the temperature and pressure settings of the printer only be high enough to achieve the desired print quality (as defined in the examples). In particular, if the temperature setting is too high this may affect the optical characteristics of the base retroreflective sheeting, and may make the thermal transfer donor element wrinkle or tear.

The following test methods and examples further illustrate the present invention but should not be considered limiting.

TEST METHODS

Print Quality Testing

Various retroreflective base sheetings were used to test the print quality produced by various thermal transfer donor elements.

The retroreflective base sheetings used were:

| | |
|---|---|
| I | an embedded lens sheeting comprising a polyester melamine top layer |
| II | an embedded lens sheeting comprising a plasticized polyvinylchloride top layer |
| III | an embedded lens sheeting comprising an extruded ethylene/acrylic acid copolymer top layer |
| IV | an encapsulated lens sheeting comprising an extruded, oriented PMMA topcoat |
| V | an embedded lens sheeting comprising a polyvinylbutyral binder layer which served as the top layer |
| VI | an embedded lens sheeting comprising a vegetable oil extended polyester melamine top layer, having an uneven surface due to lenses being closer to the surface |
| VII | an embedded lens sheeting comprising a vegetable oil extended polyester melamine top layer having a smooth surface |
| VIII | an embedded lens sheeting comprising a crosslinked polyurethane acrylate top layer |

The thermal mass transfer donor elements used to print upon the above-listed retroreflective base sheetings were as follows:

| | |
|---|---|
| 1 | donor elements useful in the invention, available from Advent Corp., under the trade designation AD501 |
| 2 | donor elements useful in the invention, available from Coding Products Corp., under the trade designations TTR59SP (black), TTR5640 (blue), TTR5340 (yellow), TTR5440 (red), and TTR5740 (green) |
| A1 | a comparative donor element available from Zebra Technologies Corp., number 5099 (black) |
| A2 | a comparative donor element available from Zebra Technologies Corp., number 5175 (black) |
| B1 | a comparative donor element available from Japan Pulp and Paper Co., number R1 (black) |
| B2 | a comparative donor element available from Japan Pulp and Paper Co., number R2 (blue) |

All of the printed images evaluated for print quality and erasure rub test, and other visual evaluation, were thermal mass transfer printed onto the retroreflective sheetings using a ZEBRA 140 thermal mass transfer printer, with temperature setting of 18, and pressure of medium-high.

EXAMPLES

Examples 1 and 2, and Comparative Examples A1, A2, B1 and B2

Table 1 reports print quality data generated using the above described retroreflective base sheetings and donor elements. Print quality (0=unacceptable, 10=perfect) was determined visually without magnification using the criteria discussed herein. If the printed indicia looked mottled, and/or had voids, and/or lacked good edge definition, and/or blocking of characters was evident, and/or rough or rounded edges were apparent, and/or the print did not appear dense, a lower rating was given. A rating of 1 to 3 represented an unsatisfactory overall appearance of the printed indicia. A rating of 4 indicated minimally acceptable print quality. A rating of 5 or greater was considered preferable, with a rating of 6 or greater more preferable.

Table 2 reports colorant binder adhesion data, evaluated by rubbing a Eberhard-Faber AMERICA 2 or equivalent eraser over the surface of the article, and the number of eraser strokes required for visually discernable removal of the colorant from the top side of the article was noted. NT designates that the Example was not tested.

Various modifications and alterations of this invention will become apparent to those skilled in the art without departing from the scope thereof. It should be understood, therefore, that the scope of this invention is not to be limited to the illustrative embodiments set forth herein, but is to be determined by the limitations set forth in the claims and equivalents thereof.

TABLE 1

PRINT QUALITY: 0 = NOT PRINTABLE,
5 = ACCEPTABLE, 10 = PERFECT

| EXAMPLE | | RETROREFLECTIVE BASE SHEETING | | | | | | | |
|---|---|---|---|---|---|---|---|---|---|
| | Color | I | II | III | IV | V | VI | VII | VIII |
| A1 | BLACK | 4 | 4 | 8 | 4 | 4 | 4 | 2 | 0 |
| B1 | BLACK | 9 | 9 | 7 | 8 | NT | 9 | 1 | 0 |
| 1 | BLACK | 7 | 7 | 7 | 3 | 6 | 7 | 9 | 5 |

TABLE 1-continued

PRINT QUALITY: 0 = NOT PRINTABLE,
5 = ACCEPTABLE, 10 = PERFECT

| EXAMPLE | | RETROREFLECTIVE BASE SHEETING | | | | | | | |
|---|---|---|---|---|---|---|---|---|---|
| | Color | I | II | III | IV | V | VI | VII | VIII |
| | BLUE | 7 | 7 | 7 | 3 | 6 | 7 | 9 | 4 |
| | GREEN | 7 | 7 | 7 | NT | 5 | 5 | 9 | 4 |
| | RED | 7 | 8 | 7 | NT | NT | 8 | 9 | 4 |
| 2 | BLACK | 8 | 7 | 9 | 7, 8 | 8 | 8 | NT | 7 |
| | BLUE | 6 | 5 | 9 | 6 | 8 | 7 | 10 | 7 |
| | YELLOW | 8 | 8 | 8 | 8 | NT | 8 | NT | NT |
| | RED | 7 | 6 | 7 | 6 | NT | 7 | 8 | 7 |
| | GREEN | NT | NT | NT | NT | NT | NT | 8 | 7 |

TABLE 2*

| ERASER TEST: STROKES TO REMOVE PRINT | | | | | | | | | |
|---|---|---|---|---|---|---|---|---|---|
| EXAMPLE | | RETROREFLECTIVE BASE SHEETING | | | | | | | |
| | Color | I | II | III | IV | V | VI | VII | VIII |
| A1 | BLACK | 16 | 20 | 20 | 18 | 20 | 25 | NT | NT |
| A2 | BLACK | NT | NT | NT | NT | NT | NT | 18 | NT |
| B1 | BLACK | 25 | 14 | 50 | 20 | NT | 50 | NT | NT |
| B2 | BLUE | NT | NT | NT | NT | NT | NT | 26 | NT |
| 1 | BLACK | 45 | 55 | 35 | NT | 35 | 60 | 56 | NT |
| | BLUE | 25 | 25 | 25 | NT | 30 | 35 | 30 | NT |
| | GREEN | 15 | 12 | 30 | NT | 20 | 25 | 24 | NT |
| | RED | 40 | 40 | 35 | NT | NT | 45 | 44 | NT |
| 2 | BLACK | 30 | 24 | 35 | 10, 14 | 25 | 30 | NT | NT |
| | BLUE | 35 | 25 | 35 | 20 | 25 | 25 | 30 | NT |
| | YELLOW | 30 | 30 | 20 | 10 | NT | 25 | NT | NT |
| | RED | 35 | 30 | 45 | 15 | NT | 35 | 32 | NT |
| | GREEN | NT | NT | NT | NT | NT | NT | 38 | NT |

*NOTES: ERASER TEST
EBERHARD FABER AMERICAN 2 HB PENCIL ERASER
EDGES OF NEW ERASER ROUNDED BEFORE TESTING
NORMAL ERASING PRESSURE APPLIED BY HAND
TEST AREAS INCLUDED PRINTED AND NON PRINTED ZONES

What is claimed is:

1. A retroreflective signage article comprising:
   a) a retroreflective base sheeting comprising a top layer positioned between retroreflective elements and a source of light, the top layer having an exposed surface devoid of mechanical and chemical primer treatments and extraneous print-receptive layers, the top layer comprising materials selected from the group consisting of polyester, polyester melamine resin, vegetable oil extended polyester melamine resin, plasticized polyvinylchloride, crosslinked aliphatic polyurethane, acrylic resins, polyvinylbutyral resin, crosslinked polyurethane/acrylics, and extruded substantially thermoplastic polymers having an elongation of at least 50% and a tensile relaxation force from 50% elongation after 5 minutes relaxation of no more than 2300 N/m width; and
   b) thermal mass transfer printed matter adhered to the exposed surface of the top layer, the thermal mass transfer printed matter consisting essentially of a polymeric binder and a colorant dispersed therein, the polymeric binder selected from the group consisting of polyethylene polymers, physical mixtures of a polyethylene polymer and an acrylic polymer, and copolymers of ethylene and an acrylic monomer.

2. An embedded lens retroreflective signage article comprising:
   a) a retroreflective base material comprising:
      i) a binder layer;
      ii) a monolayer of lenses anchored in the binder layer; and
      iii) a specularly reflective layer underlying and spaced from the lenses by a transparent material;
   b) a weather-resistant, transparent cover film attached to the binder layer of the retroreflective base material, the cover film comprising extruded, substantially thermoplastic polymer having an elongation of at least 50% and a tensile relaxation force from 50% elongation after 5 minutes relaxation of no more than 2300 N/m width; and
   c) thermal mass transfer printed matter adhered to the cover film, the thermal mass transfer printed matter consisting essentially of a polymeric binder and a colorant dispersed therein, the polymeric binder selected from the group consisting of polyethylene polymers, physical mixtures of a polyethylene polymer and an acrylic polymer, and copolymers of ethylene and an acrylic monomer.

3. Article in accordance with claim 2 wherein the substantially thermoplastic polymer comprises a copolymer of monomers comprising by weight a major proportion of at least one of ethylene and propylene and a minor proportion of a second monomer.

4. Article in accordance with claim 3 wherein the second monomer is a first acid-functional monomer selected from the group consisting of acrylic acid and methacrylic acid.

5. Article in accordance with claim 4 wherein the first acid-functional monomer is crosslinked by cations selected from the group consisting of zinc, sodium, and potassium.

6. Article in accordance with claim 2 wherein the printed matter has a melting point ranging from about 50° to about 140° C.

7. Article in accordance with claim 2 wherein the colorant is selected from the group consisting of carbon black, titania, phthalocyanines, anthraquinones, perylenes, carbazoles, monoazo- and disazobenzimidazolone, isoindolinones, monoazonaphthol, diarylidepyrazolone, rhodamine, indigoid, quinacridone, disazopyranthrone, dinitraniline, pyrazolone, dianisidine, pyranthrone, tetrachloroisoindolinone, dioxazine, monoazoacrylide, anthrapyrimidine, methine, pyrazolone, quinophthalone, naphthazine, perinone, anthraquinone, and monoazo compounds.

8. Article in accordance with claim 2 wherein the thermal mass transfer printed matter adhered to the cover film is non-black.

9. Article in accordance with claim 8 wherein the thermal mass transfer printed matter adhered to the cover film is transparent.

10. A kit for producing retroreflective signage articles, the kit comprising:
    a) a retroreflective base sheeting having a top layer; and
    b) a thermal mass transfer donor element comprising a carrier and a thermal mass transfer composition adhered to the carrier, the thermal mass transfer composition consisting essentially of a polymeric binder and a colorant dispersed therein, the polymeric binder selected from the group consisting of polyethylene polymers, physical mixtures of a polyethylene polymer and an acrylic polymer, and copolymers of ethylene and an acrylic monomer.

11. Kit in accordance with claim 10 wherein the retroreflective base sheeting is selected from the group consisting of embedded lens sheeting, encapsulated lens sheeting, cube-corner sheeting, and combinations thereof.

12. Kit in accordance with claim 11 wherein the retroreflective base sheeting is embedded lens sheeting comprising:
   a) a retroreflective base material comprising:
      i) a binder layer;
      ii) a monolayer of lenses anchored in the binder layer; and
      iii) a specularly reflective layer underlying and spaced from the lenses by a transparent material,
   b) a weather-resistant, transparent cover film attached to the binder layer of the retroreflective base material, the cover film comprising extruded, substantially thermoplastic polymer having an elongation of at least 50% and a tensile relaxation force from 50% elongation after 5 minutes relaxation of no more than 2300 N/m width (preferably no more than 1000 N/m).

13. A method of making a retroreflective signage article, the method comprising the steps of:
   a) selecting a retroreflective base sheeting having a top layer, the top layer positioned between retroreflective elements and a source of light, the top layer having an exposed surface devoid of mechanical and chemical primer treatments and extraneous print-receptive layers, the top layer comprising materials selected from the group consisting of polyester, polyester melamine resin, vegetable oil extended polyester melamine resin, plasticized polyvinylchloride, crosslinked aliphatic polyurethane, acrylic resins, polyvinylbutyral resin, crosslinked polyurethane/acrylics, and extruded substantially thermoplastic polymers having an elongation of at least 50% and a tensile relaxation force from 50% elongation after 5 minutes relaxation of no more than 2300 N/m width;
   b) selecting a thermal mass transfer donor article, the donor article comprising a carrier and a thermal mass transfer composition adhered to the carrier, the thermal mass transfer composition consisting essentially of a polymeric binder and a colorant dispersed therein, the polymeric binder selected from the group consisting of polyethylene polymers, physical mixtures of a polyethylene polymer and an acrylic polymer, and copolymers of ethylene and an acrylic monomer; and
   c) thermal mass transfer printing at least a portion of the composition to the top layer of the retroreflective base sheeting.

14. Method in accordance with claim 13 wherein said top layer comprises materials selected from the group consisting of polyester melamine resins, oil modified polyester melamine resins, plasticized polyvinylchloride, acrylic resins, and extruded substantially thermoplastic polymers having an elongation of at least 50% and a tensile relaxation force from 50% elongation after 5 minutes relaxation of no more than 2300 N/m width.

* * * * *